United States Patent [19]

Björklund et al.

[11] Patent Number: 5,657,213
[45] Date of Patent: Aug. 12, 1997

[54] METHOD AND DEVICE FOR CONTROL OF A SERIES-COMPENSATED CONVERTER STATION

[75] Inventors: Per-Erik Björklund, Bjursås; Tomas Jonsson, Grängesberg, both of Sweden

[73] Assignee: Asea Brown Boveri AB, Vasteras, Sweden

[21] Appl. No.: 538,607

[22] Filed: Oct. 3, 1995

[30] Foreign Application Priority Data

Oct. 13, 1994 [SE] Sweden ................... 9403488

[51] Int. Cl.$^6$ ................................. H02J 3/36
[52] U.S. Cl. .................. 363/35; 363/37; 363/39
[58] Field of Search ........................ 363/35, 51, 37, 363/39, 79; 323/102, 207; 324/107

[56] References Cited

U.S. PATENT DOCUMENTS 4,210,956  7/1980  Watanabe ................... 363/51
4,264,951  4/1981  Konishi et al. ............. 363/35

*Primary Examiner*—Peter S. Wong
*Assistant Examiner*—Rajnikant B. Patel
*Attorney, Agent, or Firm*—Watson Cole Stevens Davis, P.L.L.C.

[57] ABSTRACT

Control equipment (CE2) generates an ordered value (AOL) of a control angle ($\alpha$) in dependence on a limiting signal (AMAXL), capable of being influenced, for a converter included in a series-compensated converter station. A calculating value (AMARG) of a control angle is calculated continuously according to a predetermined relationship (M0, M1, M2, M3) which at least approximately resembles a relationship according to which, at a commutating margin ($\gamma_m$) equal to a preselected value ($\gamma_p$), said control angle is a function (F0) of a current (Id2) and a voltage (Un2) in the converter station and the limiting signal is formed in dependence on the calculating value.

10 Claims, 4 Drawing Sheets

METHOD AND DEVICE FOR CONTROL OF A SERIES-COMPENSATED CONVERTER STATION

TECHNICAL FIELD

The present invention relates to a method for control of a series-compensated converter station in inverter operation, included in an installation for transmission of high-voltage direct current, and to a device for carrying out the method.

By a series-compensated converter station is meant in this connection a converter station, the converter bridges of which are connected to an alternating-voltage network via series capacitors, possibly with an intermediate transformer.

BACKGROUND ART

An installation for transmission of high-voltage direct current between two alternating-voltage networks comprises two converter stations, each one connected on its ac side to a separate one of the alternating-voltage networks, and a common dc connection. The dc connection may be in the form of an overhead line and/or a cable and also in certain parts consist of ground or water instead of a metallic conductor. In certain cases the converters are erected in the immediate vicinity of each other, so-called back-to-back erection, whereby the dc connection may consist of short busbars. Each one of the converter stations comprises a converter, usually at least one converter transformer for connection of the converter to the alternating-voltage network, as well as shunt filters for generation of reactive power and filtering of harmonics. The converters are normally line-commutated, current-source converters, by which is to be understood that the current commutation between the valves of the converters takes place by means of voltages occurring in the alternating-voltage network, and that the dc connection, viewed from the converters, occurs as a stiff current source. For the purpose of reducing the harmonics generated by the converters, especially the 5th and 7th harmonics, each one of the converters usually consists of two mutually series-connected six-pulse bridges, each one connected to the alternating-voltage network via a separate secondary winding on the converter station, the transformer being connected such that the secondary windings have a mutual phase shift of 30°.

During normal operation, one of the converters, hereinafter referred to as the rectifier, operates in rectifier operation, and the other, hereinafter referred to as the inverter, operates in inverter operation. Control equipment for the respective converter generates a control signal corresponding to a control angle $\alpha$ at which firing pulses are applied to the valves of the converters. For the purpose of minimizing the consumption of reactive power by the converters, and reducing the stresses on components included in the converter stations, it is advantageous to control the rectifier with the smallest possible control angle $\alpha$ and to control the inverter with a control angle which results in the smallest possible extinction angle $\gamma$ (margin of commutation) without jeopardizing the controlled operation. The control system of the installation is, therefore, usually designed such that the inverter is controlled to a suitable maximum direct voltage for the operating conditions of the installation, taking into consideration safety margins with respect to commutating errors, voltage variations on the ac network, and other deviations from nominal operation which may occur. The rectifier is controlled in current control, the reference value of which is formed in dependence on a current order, which in turn is formed in dependence on a power order and the prevailing direct voltage in such a way that the direct current and hence the transferred active power remain at a desired value.

To ensure that the valve, at the moment of firing, has sufficient firing voltage, that is, forward voltage in blocked state, the control equipment of the rectifier further comprises a lower limitation of the control angle such that its minimum value is not lower than a preselected lowest value. This limitation is conventionally achieved by sensing the voltage across the valve with a measuring device, whereby firing pulse for the valve is generated only when the sensed voltage exceeds a preselected value.

Usually, the control equipment for rectifiers and inverters is designed identically, whereby in the rectifier a current controller is activated and in the inverter control equipment for a control with the aim of maintaining the extinction angle at, but not lower than, a preselected lowest value is activated.

For a general description of the technique for transmission of high-voltage direct current, reference is made to Erich Uhlmann: Power Transmission by Direct Current, Springer Verlag, Berlin Heidelberg New York 1975, in particular pages 125–136.

Between the control angle $\alpha$, the extinction angle $\gamma$ and the overlap angle u, the known relationship $\alpha+u+\gamma=180°$ prevails. It is thus desirable to determine the control angle for the inverter such that the extinction angle (margin of commutation) remains at a preselected lowest value.

U.S. Pat. No. 4,210,956 describes a method for control of an installation for transmission of high-voltage direct current. According to the method, for each one of the converters included in the installation, the control angle of the converter is calculated based on given values of voltage and current at each converter in the installation. The calculation is performed by means of known relationships between current, voltage, commutating reactance and control angle with a view to achieving a situation whereby the installation in its entirety can be operated under stable conditions. The minimum permissible control angle, that is, the minimum firing voltage, and the minimum permissible extinction angle, are thus regarded as limit values in these calculations. The converters are not series-compensated and the method appears essentially to be intended for so-called multiterminal systems, in which more than two converter stations are connected to a common dc connection.

U.S. Pat. No. 4,264,951 describes equipment for control of an installation for transmission of high-voltage direct current. The equipment comprises, in addition to control means for control on constant current, constant voltage and constant extinction angle, also a device which, based on applied values of an alternating voltage and an alternating current sensed at the converter, calculates the limit values for the control angle of the converter at which limit values the losses in the damping circuits of the converter valves amount to a certain value. Output signals from the mentioned devices are supplied to a selector means in which a control-angle signal is selected from any of the mentioned control means while taking into consideration that the calculated limit values are not exceeded.

U.S. Pat. No. 4,563,732, especially FIGS. 1 and 2 with the associated description, shows a method and a device for control of a converter in inverter operation. A current controller comprises a proportional-amplifying and an integrating member. The proportional-amplifying member is supplied with a reference value for the current in the dc connection subtracted by a sensed value of this current. The integrating member is also supplied with the reference value of the current in the dc connection subtracted by the sensed value of this current but, in addition, subtracted by a current margin. The sum of the output signals from the proportional-amplifying member and the integrating member constitutes the control angle order delivered by the control system to the control pulse device of the inverter. Under stationary conditions, the output signal from the proportional-amplifying member is equal to or near zero whereas the input signal to the integrating member consists of the current margin. The integrating member comprises a controllable limiting input by means of which its output signal may be limited and the value of the control angle α ordered by the inverter is thus determined by the mentioned limiting signal. The limiting input is supplied with a limiting signal, formed by a calculating circuit and corresponding to a control signal for the inverter and calculated based on relationships, known to the main circuit of the converter station, between the ideal direct voltage of the converter at the control angle equal to zero, a direct current corresponding to the reference value of the current controller, the impedance of the alternating-voltage network, a preselected extinction angle (margin of commutation) and the corresponding control angle. The above-mentioned limiting signal may be corrected by a slowly acting control circuit with negative feedback of a sensed value of the extinction angle which is compared with a reference value for this angle. Control pulses are generated, in addition to the above-described control system, also by an extinction angle control circuit, based on the fact that a certain minimum voltage-time area is required for the semiconductor elements included in the valves, usually thyristors, to be able to resume their blocking state after decommutation. On the basis of a sensed value of the commutating voltage and while assuming a certain shape of the curve therefor, the remaining voltage time area is continuously calculated up to the zero crossing of the commutating voltage, corrected for the length of the commutating interval which is dependent on the direct current. When the corrected voltage time area is equal to the smallest voltage time area required, generation of the firing pulse of the valve is initiated. The firing pulse, which is dependent on the current controller and on the extinction-angle control circuit, is supplied to an OR circuit such that that of the two pulses which first arrives at the OR circuit initiates firing of the valve.

It has proved that the control system of the inverter, designed in conventional manner, is sensitive to disturbances in stationary operation. Since the control of the inverter per se results in a negative current/voltage characteristic occurring in the inverter, a small voltage reduction on the alternating-voltage network of the inverter may lead to an avalanche-like growth of the direct current. To obtain a stable control of the current, the rectifier must, through its current control, exhibit a positive current/voltage characteristic to compensate for the negative characteristic in the control system of the inverter. A high capacitance to ground in the dc connection, which occurs when the dc connection is in the form of a long cable, means that the current control of the rectifier and the control system of the inverter are to a certain extent disconnected from each other. Fast voltage reductions in the alternating-voltage network, for example in case of short-circuit faults or single-phase or multi-phase ground faults, may lead to the voltage at the inverter breaking down. In order for the inverter, through its control-angle control, to be able to counteract such events, in conventional, non-series-compensated converter stations the control system must, therefore, during stationary operation, operate with a commutating margin greater than that which corresponds to normal safety with respect to commutating errors. However, this entails, on the other hand, increased reactive power consumption during stationary operation with ensuing higher costs for compensation and an uneconomical dimensioning of the installation in its entirety.

It is known to series-compensate converter stations by connecting converter bridges, comprised in the converter station, to the respective alternating-voltage network via series capacitors. This results in several advantages. The series capacitors are charged periodically by the current traversing it and the voltage thus generated across the capacitors provides an addition to the commutating voltage across the valves of the converter. The commutating voltage becomes phase-shifted in relation to the voltages of the alternating-voltage network in such a way that, with control and extinction angles still related to the phase position for the voltages of the alternating-voltage network, the valves in rectifier operation may be controlled with control angles smaller than zero and, in inverter operation, with extinction angles smaller than zero (although the commutating margin related to the commutating voltage of the valve is, of course, greater than zero). This makes possible a reduction of the reactive power consumption of the converters. This reduces the need of generation of reactive power in the shunt filters and these may thus be dimensioned substantially based on the need of harmonic filtering. The charging current of the capacitors and hence their voltage are proportional to the direct current in the dc connection and by suitable dimensioning of the capacitors, the dependence of the overlap angle on the magnitude of the direct current may be compensated. This means that the series compensation contributes to maintain the commutating margin of the valves also in case of fast current transients. Also the dependence of the commutating margin on the amplitude of the alternating-voltage network is influenced in a favourable direction by the series compensation in that the above-mentioned negative current/voltage characteristic in the converter control is influenced in a stabilizing direction and, by suitable choice of series capacitors, can also be caused to be positive.

A general description of the mode of operation of the converter station with series capacitors introduced into the ac connections between the converter transformer and a converter in a six-pulse bridge connection is given in John Reeve, John A. Baron, and G. A. Hanley: A Technical Assessment of Artificial Commutation of HVDC Converters with Series Compensation (IEEE Trans. on Power Apparatus and Systems, Vol. PAS-87, Oct. 1968, pages 1830–1840).

Thus, it is desirable in many contexts to series-compensate converter stations of the kind described above.

However, series compensation of the converter station means that the commutating voltage of the valves is dependent on both amplitude and phase for the current-dependent voltage across the respective series capacitor. During series compensation, thus, the commutating voltage of the valves cannot be directly derived from voltages sensed in the alternating-voltage network in the way which is possible in non-series-compensated converter stations, and on which the above-mentioned principles of control of the extinction angle and the firing-voltage conditions of the rectifier are based.

For the main circuits of the series-compensated converter stations, current/voltage equations may be set up in a known manner, with the control angle α (related to the voltages of the alternating-voltage network), the direct current Id, the ideal no-load direct voltage Udi0 and the commutating margin $\gamma_m$ (in inverter operation) as variables. If in these equations a constant preselected value $\gamma_p$ of the commutating margin of the valve is assumed, the control angle α may be calculated with the direct current and the ideal no-load direct voltage as variables.

However, in series-compensated converter stations, the current/voltage equations become considerably more complicated than in non-series-compensated ones and the calculation cannot be performed quite simply, as in U.S. Pat. No. 4,563,732, such that the control angle is explicitly solved from the equation. A calculation of the control angle based on these equations must be suitably carried out by iteration, which places heavy demands on calculation speed and/or the supply of the calculation capacity.

The control of an inverter, wherein a calculating circuit is adapted to explicitly form, starting from the current/voltage equations of the main circuits, a signal corresponding to the desired control angle, as described in the above-mentioned U.S. Pat. No. 4,563,732, therefore becomes disadvantageous in connection with a series-compensated converter.

A direct measurement of the extinction angle is rendered considerably more complicated by the introduction of series compensation in that an individual measurement would be required at each valve, thus a considerable complication and cost.

SUMMARY OF THE INVENTION

The object of the invention is to provide a method of the kind described in the introduction, which permits a control of the inverter, which is simple and satisfactory from a technical and economic point of view, without sensing of commutating voltages occurring across the valves, and a device for carrying out the method.

In this way, the advantages of the series compensation can be made use of without having to carry out the technically complicated and costly measurement of extinction angle individually across each one of the valves of the converter bridges.

What characterizes a method and a device according to the invention will become clear from the appended claims.

Advantageous improvements of the invention will become clear from the following description and claims

BRIEF DESCRIPTION OF THE DRAWINGS

The invention will be explained in greater detail by description of embodiments with reference to the accompanying drawings, wherein FIG. 1 schematically shows an installation for transmission of high-voltage direct current with series-compensated converter stations.

DESCRIPTION OF THE PREFERRED EMBODIMENTS

The following description relates both to the method and to the device, and the figures can thus be regarded both as signal flow diagrams and block diagrams of devices. The expressions "calculating value" and "signal" are therefore used synonomously.

It is assumed in the following that the control angle α, the angle when commutation is started, and the extinction angle γ, the angle when commutation is terminated, are related to the voltages of the respective alternating-voltage network in a conventional manner. By commutating margin $\gamma_m$ is meant the extinction angle related to the commutating voltage across a valve in a converter bridge. For a non-series-compensated converter station, the extinction angle γ is thus equal to the commutating margin $\gamma_m$, whereas for a series-compensated converter station the extinction angle γ generally deviates from the commutating margin $\gamma_m$ and may also assume values less than zero.

Figure 1:
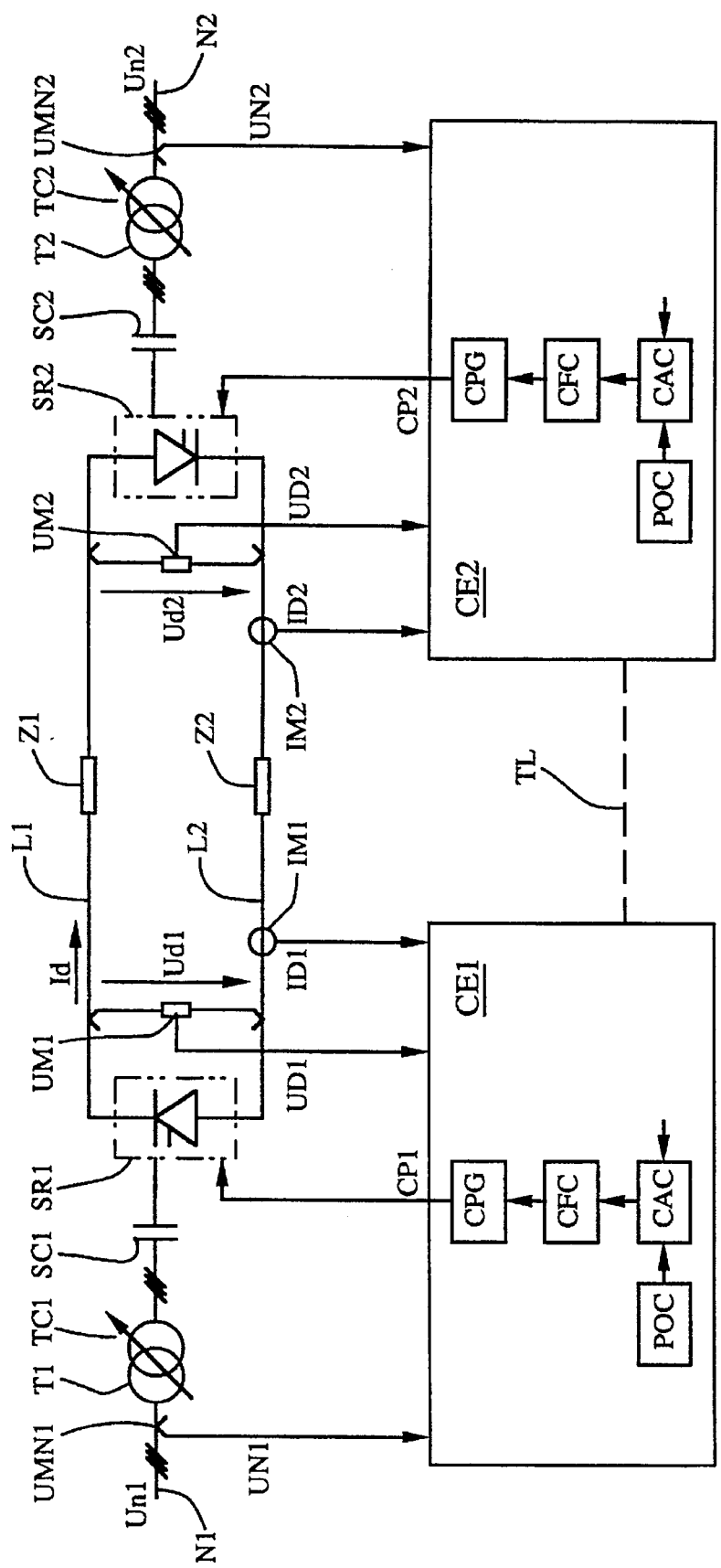

FIG. 1 shows an installation for transmission of high-voltage direct current between two three-phase alternating-voltage network N1 and N2, only roughly indicated. A converter SR1 is connected with its alternating-voltage terminals to the network N1 via series capacitors SC1 and a transformer T1 and a converter SR2 is connected with its alternating-voltage terminals to the network N2 via series capacitors SC2 and a transformer T2. Each one of the transformers is equipped with a tap-changer TC1, TC2, respectively, marked with an arrow in the figure. A dc connection L1, L2 connects the direct-voltage terminals of the converter SR1 to the corresponding direct-voltage terminals on the converter SR2. The impedances of the dc connection are designated Z1, Z2, respectively. Further, shunt filters (not shown in the figure) for generation of reactive power and filtering of harmonics are connected to the respective alternating-voltage network.

For the description of the embodiment it is assumed that the converter SR1 operates as a rectifier and the converter SR2 operates as an inverter, but both converters are adapted to be able to operate in a known manner both as rectifiers and inverters.

Figure 2:
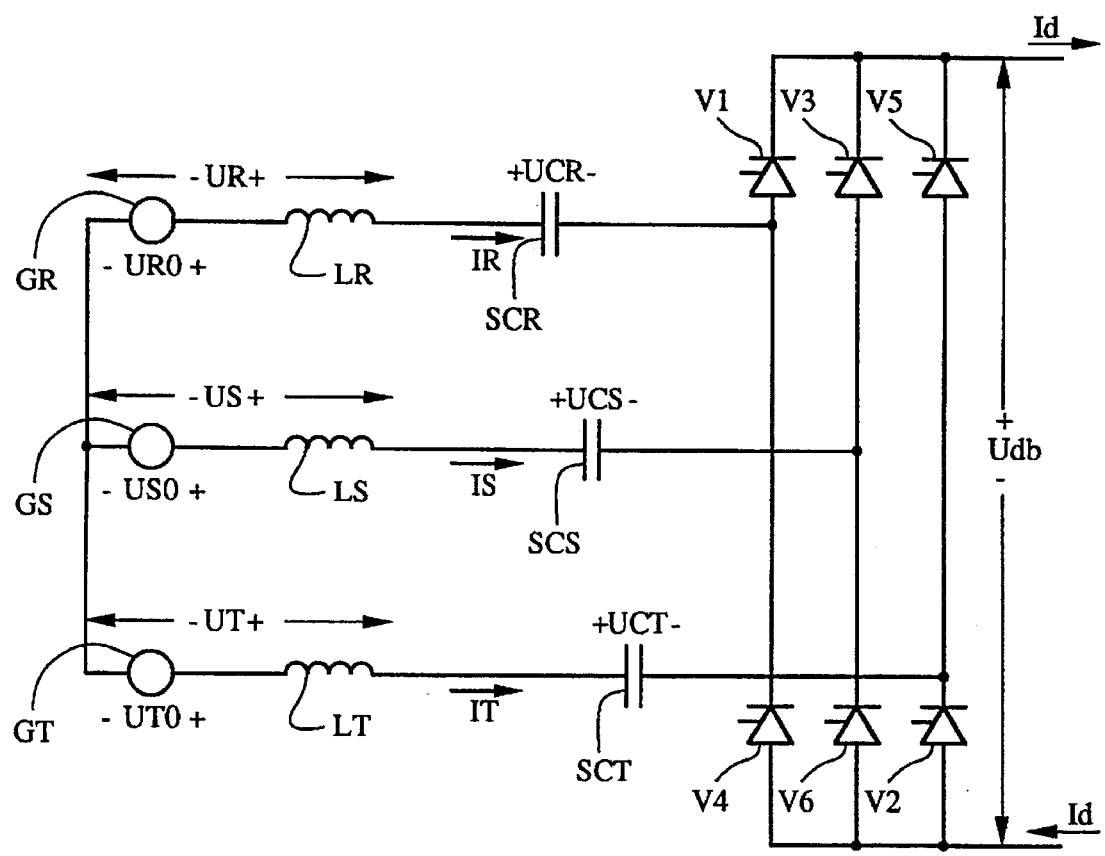
FIG. 2 shows a converter bridge connected via series capacitors to a three-phase alternating-voltage network.

The converters may be designed in a known manner as two series-connected 6-pulse bridges to form a 12-pulse connection, whereby each of the transformers comprises two secondary windings with a mutual phase shift of 30°, for example one secondary winding in Y connection and one secondary winding in Δ connection. FIG. 2 shows a six-pulse bridge, comprising six mutually identical valves V1–V6, shown as thyristors in the figure, connected on the alternating-voltage side via series capacitors SC1R, SC1S, SC1T to a three-phase network comprising three voltage generators GR, GS, GT in series connection with three inductors LR, LS, LT, respectively, which network constitutes an equivalent circuit for the above-mentioned transformer, shunt filter and alternating-voltage network.

During, for example, commutation from the valve V1 to the valve V3, the commutating voltage UKV=US–UCS–UR+UCR.

The direct voltage across the six-pulse bridge is designated Udb and in the event that the converter comprises two series-connected six-pulse bridges, the direct voltage of the converter, designated Ud, becomes equal to two times Udb.

Each converter is equipped with a piece of control equipment CE1, CE2, respectively (FIG. 1). Each one of the pieces of control equipment comprises a control angle unit CAC for forming an ordered value of the control angle α, which control angle unit will be described in greater detail below, units CFC designed in a manner known per se for determining the firing moment of the respective valve in dependence on the ordered value of the control angle α, and CPG for generating control pulses CP1 and CP2, respectively, to the valves included in the converters at the firing moment. From a power control unit POC, the control angle unit CAC is supplied with a reference value for active power, which reference value is formed in a manner known per se. The control angle unit may also be supplied with other reference values from superordinate control systems, not shown in the figure, for example for control of reactive power exchange with the alternating-voltage networks.

The direct voltage Ud1 of the rectifier and the direct voltage Ud2 of the inverter are measured by means of voltage-measuring devices UM1, UM2, respectively, which deliver the measured values UD1 and UD2, respectively. The current Id through the dc connection is measured by means of current measuring devices IM1, IM2, respectively, which deliver the measured values ID1 and ID2, respectively. The voltages Un1 and Un2, respectively, of the alternating-voltage networks are measured by means of voltage-measuring devices UMN1 and UMN2, respectively, which deliver the measured values UN1 and UN2, respectively.

The pieces of control equipment of the converters are supplied with the above-mentioned measured values of the operating parameters of the installation, that is, the control equipment of the rectifier is supplied with measured values for the voltage of the alternating-voltage network, for the direct voltage of the rectifier, and the direct current in the dc connection, and the control equipment of the inverter is supplied with corresponding measured values relating to the inverter. In addition, the pieces of control equipment are supplied (in a manner not shown in the drawings but known per se) with input signals with information about the position of the tap-changers and a power-direction signal RECT/INV, the latter signal indicating rectifier operation and inverter operation, respectively, and being determined in dependence on the power direction requested by the operator of the installation.

In dependence on measured values and input signals supplied to the pieces of control equipment, the pieces of control equipment of the rectifier and the inverter generate control pulses CP1 and CP2, respectively, for the valves of the converters and supply these to the respective valve.

The two pieces of control equipment communicate with each other, in a manner known per se, via a telecommunication link TL for two-way transmission of information about the operating parameters of the converters.

The respective control equipment may also comprise a tap-changer control unit, not shown in the figure but designed in a manner known per se, for generation of INCREASE/DECREASE impulses for the tap-changers, which impulses are supplied to the operating equipment of the tap-changers.

Figure 3:
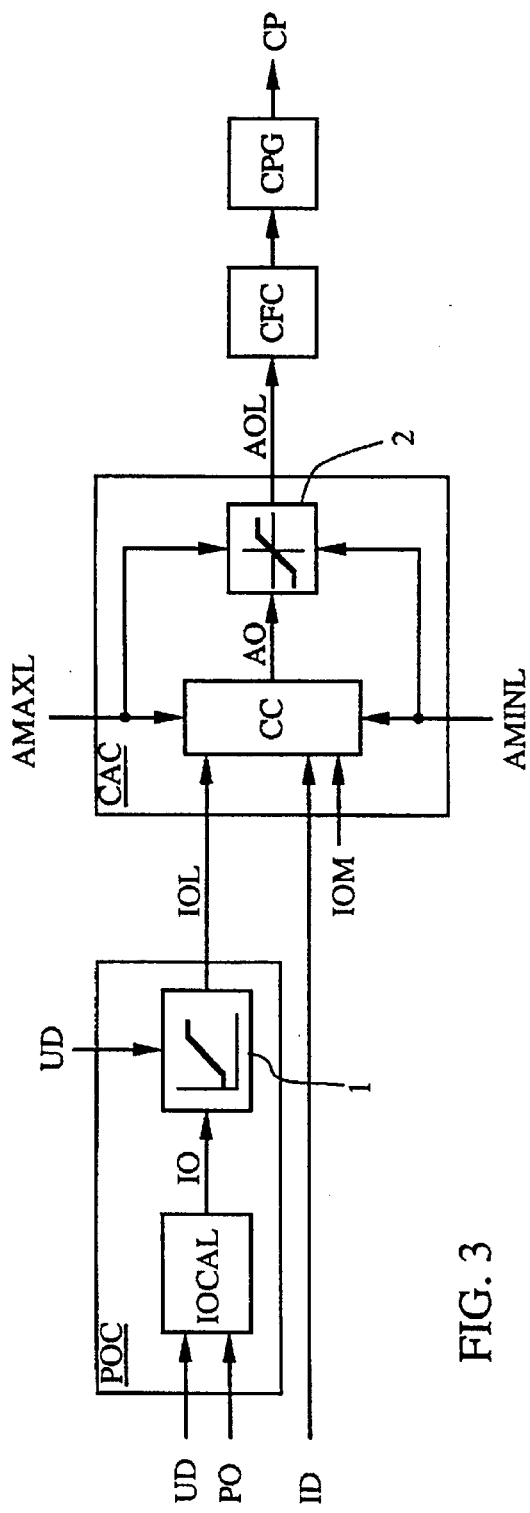
FIG. 3 shows in the form of a block diagram parts of control equipment for the converter stations according to FIG. 1, in one embodiment of the invention

FIG. 3 shows parts of a piece of control equipment for the converter stations according to FIG. 1, in one embodiment of the invention. The pieces of control equipment are usually designed identically for both rectifiers and inverters, and therefore in FIG. 3 and the subsequent FIG. 4, indices 1 and 2, respectively, for indicating quantities relating to a rectifier and an inverter are not indicated.

The power control unit POC comprises a calculating member IOCAL for calculating a current order IO as the quotient between a power order PO for transferred active power in the dc connection and a measured value UD1 of the direct voltage Ud1 in the rectifier. The current order is supplied to a limiting member 1 for limiting the current order in dependence on the measured value UD1 of the direct voltage Ud1, supplied to the abovementioned limiting member. The output signal IOL from the limiting member 1 is thereafter supplied to a current controller CC comprised in the control angle unit CAC as reference value for this controller.

The output signal AO of the current controller is limited to its minimum and its maximum value in a limiting member 2 by means of a limiting signal AMINL and a limiting signal AMAXL, respectively, both of these limiting signals being capable of being influenced. The output signal AOL from the limiting member 2, which thus is an ordered value of the control angle α, is supplied to the unit CFC for determining the firing moment of the respective valve.

Figure 4:
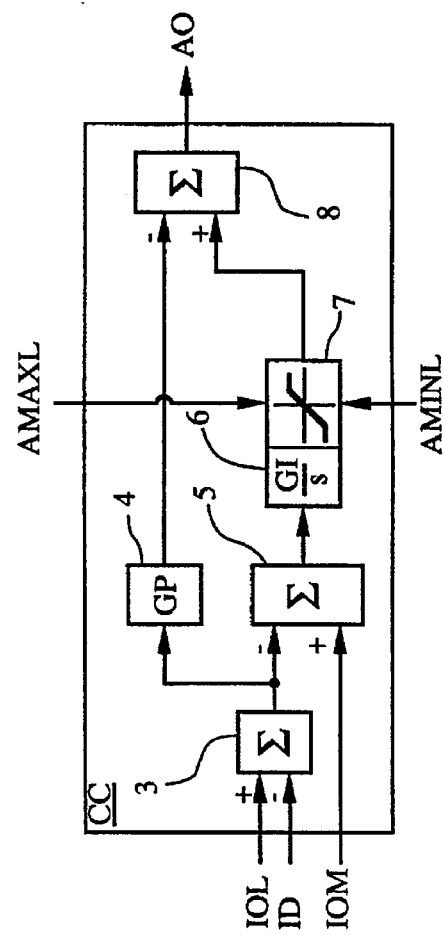
FIG. 4 shows in the form of a block diagram an embodiment of a current controller for control equipment according to FIG. 3.

FIG. 4 shows an embodiment of the current controller CC of a kind similar to that described in the above-mentioned U.S. Pat. No. 4,563,732. A first summator 3 forms as output signal the difference between the reference value IOL for the direct current Id and the measured value ID of this current. The difference is supplied to a proportional-amplifying member 4 with a gain GP and to a summator 5. The summator 5 is also supplied with a preselected current margin IOM between the rectifier and the inverter, and thus forms as output signal the difference between the current margin and the output signal from the first summator 3. The output signal from the summator 5 is supplied to an integrating member 6 with the integration time constant 1/GI. The integrating member comprises a limiting member 7 which limits the output signal from the integrating member to its maximum and to its minimum value in dependence on the limiting signals AMAXL and AMINL, respectively. The output signals from the proportional-amplifying member 4 and the integrating member, limited by the limiting member 7, are supplied to a third summator 8, which as output signal forms the output signal AO of the current controller as the difference between the output signal from the integrating member and the output signal from the proportional-amplifying member.

The current orders and the current margins for the rectifier and the inverter are synchronized via the telecommunication link TL.

The current margin IOM is usually equal to zero for the rectifier and for the inverter it is set at a value different from zero and with such a sign that the control equipment of the inverter strives to reduce the direct current controlled by the rectifier. Thus, during stationary inverter operation, the input signal to the integrating member 6 consists of the current margin, which means that its output signal will assume its maximum value limited by the limiting signal AMAXL. The output signal from the proportional-amplifying member 4 is, during an equilibrium state, equal to zero or near zero, so the value of the control angle α ordered by the inverter is determined by the above-mentioned limiting signal.

Figure 5:
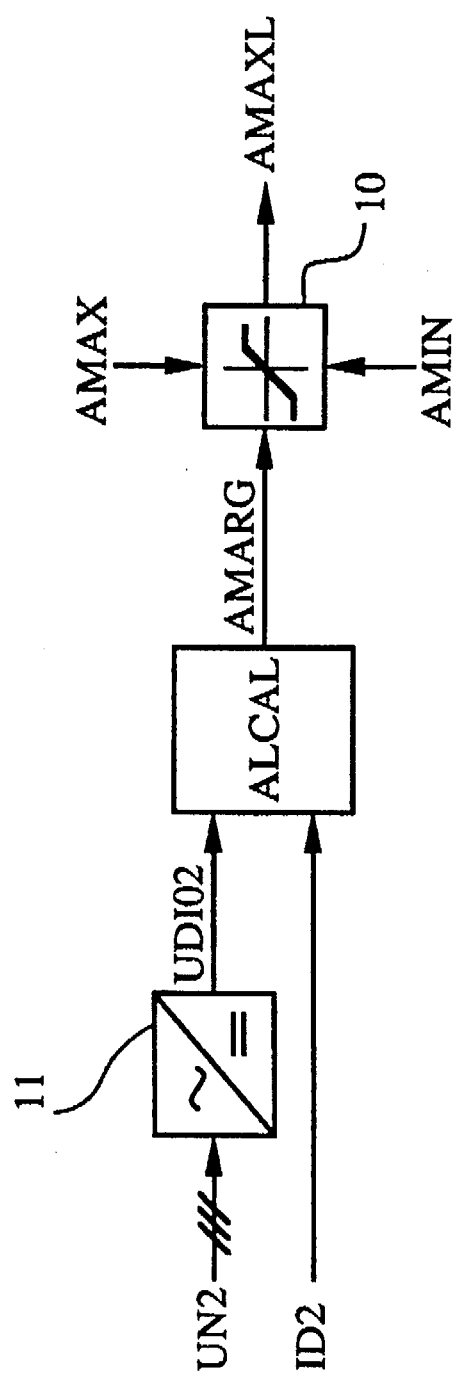
FIG. 5 shows in the form of a block diagram a limitation of the maximum control angle in inverter operation for control equipment according to FIG. 3, in one embodiment of the invention.

FIG. 5 shows how the limiting signal AMAXL is formed in an advantageous embodiment of the invention. A calculating unit ALCAL forms an output signal AMARG as a calculated value of the control angle according to a certain relationship M, of which some embodiments will be described in greater detail below. The output signal AMARG is supplied to a limiting member 10, which by means of limiting signals AMAX and AMIN, respectively, limit the output signal AMARG to its maximum and minimum value. The output signal from the limiting member 10 constitutes the limiting signal AMAXL, which is supplied to the limiting member 7, comprised in the integrating member of the current controller, and the limiting member 2 of the control angle unit CAC.

For the main circuits of the series-compensated converter station in inverter operation, current/voltage equations may be set up, in a manner known per se, with the control angle $\alpha$ (related to the voltages of the alternating-voltage network), the direct current Id2, the ideal no-load direct voltage Udi02, and the commutating margin $\gamma_m$ of the valve as variables. If in these equations a constant preselected value $\gamma_p$ of the commurating margin of the valve is assumed, the control angle $\alpha$ can be calculated, suitably iteratively, with the direct current and the ideal no-load direct voltage as variables. In formal terms, this may be expressed such that the control angle is a function F0 of the direct current Id2 and the ideal no-load direct voltage Udi02 at a commutating margin for the valves equal to a preselected value $\gamma_p$, $\alpha$=F0(Id2, Udi02, $\gamma_p$).

A voltage value UDI02 is formed in a manner known per se as the output signal from a rectifier 11, which rectifies the measured value UN2 on the voltage Un of the alternating-voltage network, taking into consideration the current transformer ratio.

By applying to the calculating unit ALCAL a measured value ID2 of continuously sensed values of the direct current Id2 and the voltage value UDI02 of the ideal no-load direct voltage of the inverter, formed in dependence on continuously sensed voltage values in the alternating-voltage network N2, and including in the calculating unit calculating members adapted to continuously calculate the control angle according to a relationship M0, according to which the control angle is the above-mentioned function F0, and applying to the respective valves of the inverter this calculated value of the control angle, the valves of the inverter bridges will thus operate with a constant commutating margin equal to the preselected value $\gamma_p$ for varying values of direct current and ideal no-load direct voltage, without the commutating voltages prevailing across the respective valves being known.

A study of representative installations have shown that a satisfactory commutating margin in series-compensated converter stations may be achieved over large intervals in current and voltage even when the output signal from the calculating unit is formed as a calculated expressed according to a relationship which approximately imitates the above-described relationship M0. In this way, simplified functions for the dependence of the ordered control angle on direct current and ideal no-load direct voltage at a constant commutating margin may be assumed, which means that the calculating members comprised in the calculating unit may be designed simpler and carry out the calculation faster.

By a suitable choice of series capacitors, the commutating margin of the valves may be caused to vary by only a few degrees over large intervals in the direct current even when the inverter is controlled with a constant control angle, that is, the calculating unit calculates the control angle according to a relationship M1 according to which the control angle is a function M1=constant=A1. However, in general this way of controlling the inverter leads to the commutating margin of the valves increasing with increasing current. To improve the capacity of the inverter to counteract overcurrents, especially in those cases where the dc connection comprises a long cable, it has proved advantageous to control the inverter with a control angle which increases with increasing direct current, at least for currents larger than 1 per unit. A study of a certain installation showed that control with a constant control angle, in this case $\alpha$=163°, gave a variation of the commutating margin of only 2° to 3° over an interval in direct current from 0 to 1 per unit, at a constant no-load direct voltage corresponding to 1.0 per unit. At currents exceeding 1 per unit, the commutating margin increased and had, at a direct current of 2 per unit, increased to about 11° above its lowest value.

Control with a current-dependent control angle, that is, the calculating unit adapted to calculate the control angle according to the function $\alpha$=M2(Id2)=A2+B2*Id2, where Id2 is the direct current in per unit, gave as a result that the commutating margin, at the direct current 2 per unit and the ideal no-load direct voltage 1 per unit, at a control angle calculated according to the above-mentioned expression, increased by only about 5° above its lowest value. In this case, the function M2=157°+5.5*Id2, was chosen, and the thus calculated value was limited between a maximum value of 168° and a minimum value of 163°, that is, AMAX and AMIN according to FIG. 5 are set equal to 168° and 163°, respectively. For currents exceeding 1 per unit, the control angle thus increased from a minimum value of 163° to a maximum value of 168° at the direct current Id2=2 per unit.

On considering the voltage dependence of the commutating margin of the valves, however, it is found that with the control angle calculated according to a function M2 according to the above, the commutating margin at high currents decreases somewhat with increasing voltage, typically of the order of magnitude of 5° when the voltage increases from 1 per unit to 1.3 per unit at Id2=2 per unit.

Control with a current- and voltage-dependent control angle, that is, the calculating unit adapted to calculate the control angle according to a function $\alpha$=M3(Id2, Udi02) 32 A3+B3*Id2/Udi02, where Udi02 is the ideal no-load direct voltage in per unit, an additional improvement of the dependence of the commutating margin on the current and voltage of the converter station is achieved. The result was that the commutating margin increased by only about 3° from its lowest value, when the direct current, at the ideal no-load direct voltage 1 per unit, increased from 1 per unit to 2 per unit, and decreased by 2° to 3° when the ideal no-load direct voltage, at the direct current 2 per unit, increased from 1 per unit to 1.5 per unit.

In this case, the function M3=158°+5*Id2/Udi02 was chosen, and the limiting values AMAX and AMIN were chosen to be 168° and 160°, respectively. An additional improvement of the dependence of the commutating margin on the current and voltage of the converter station was achieved. At Udi02=1 per unit, the commutating margin increased by only about 3° from its lowest value when the direct current Id2 at Udi02 equal to 1 per unit increased to 2 per unit whereas, at the current equal to 2 per unit at a voltage variation from Udi02=1.0 to Udi02=1.5, it decreased by about 2° to 3°.

When the calculating unit ALCAL is adapted to calculate the control angle according to any of the above-mentioned functions M0 and M3, it is thus continuously supplied with the measured value ID2 of the direct current Id2 and the voltage value UDI02 of the ideal no-load direct voltage Udi02 and calculates a value of the control angle in dependence on these measured values and a preselected value $\gamma_p$ of the commutating margin. When the calculating unit is adapted to calculate the control angle according to the above-mentioned function M2, it is, of course, sufficient for it to be supplied with the measured value ID2 and when it is adapted to calculate the control angle according to the above-mentioned function M1, it operates independently of sensed operating parameters in the converter station.

The limiting members, calculating units and function-forming members shown in the block diagrams may in applicable parts be designed as a model comprising analog and/or digital means for modelling or be designed completely or partially as calculations by means of analog and/or digital technique in hard-wired circuits, or be implemented as programs in a microprocessor.

In the event that it should be desired to operate the installation with different commutating margins under different operating conditions, the preselected commutating margin $\gamma_p$ may, of course, be included as a parameter in the calculating members arranged in the calculating unit, and the desired value be supplied to the calculating unit as a value which may be influenced by the operator.

Although FIGS. 1–2 show series capacitors connected to the converter bridges, the invention also comprises those cases where the converter bridges are connected to transformers and the series capacitors are connected between transformers and network.

Although it is advantageous to use direct current and ideal no-load direct voltage as variables in the function F0, also the corresponding ac quantities at the respective converter stations may be used since between direct current and alternating current and between ideal no-load direct voltage and the voltage of the alternating-voltage network, respectively, taking into consideration the transformer ratio and the tap-changer position, relations known per se prevail. In these cases, the calculating unit may, of course, be supplied with sensed values of the above-mentioned ac quantities.

We claim:

1. A method for control in inverter operation of a series-compensated converter station included in an installation for transmission of high-voltage direct current, the converter station comprising a converter which is controlled by control equipment and which is connected to a three-phase alternating-voltage network by means of series-connected capacitors, comprising the steps of:

the control equipment generating an ordered value of a control angle for valves included in the converter in dependence on a variable limiting signal, continuously calculating a calculating value of a control angle for the converter according to a relationship which at least approximately expresses said control angle as a function of a current and of a voltage in the converter station, at a commutating margin for the valves equal to a preselected value, and forming the limiting signal in dependence on said calculating value of said control angle.

2. A method according to claim 1, wherein said calculating value of said control angle is calculated according to a relationship which expresses said control angle as a constant value.

3. A method according to claim 1, wherein said calculating value of said control angle is calculated in dependence on a current, continuously sensed in the converter station, according to a relationship which expresses said control angle as a linear function of said current.

4. A method according to claim 3, wherein said calculating value of said control angle is calculated in dependence also on a voltage, continuously sensed in the converter station, according to a relationship which expresses said control angle as a linear function of a quotient between said current and said voltage.

5. A method according to claim 1, wherein said calculating value of said control angle is limited so as not to exceed a maximum value and not to be lower than a minimum value.

6. A device for control in inverter operation of a series-compensated converter station included in an installation for transmission of high-voltage direct current, the converter station comprising a converter which is controlled by control equipment and which is connected to a three-phase alternating-voltage network by means of series-connected capacitors, the control equipment comprising a control angle unit for generating an ordered value of a control angle for valves included in the converter in dependence on a variable limiting signal, wherein the control equipment further comprises a calculating unit which continuously calculates a value of a control angle for the converter according to a relationship which at least approximately expresses said control angle, at a commutating margin for the valves equal to a preselected value, as a function of a current and of a voltage in the converter station, and the limiting signal is formed in dependence on said calculated value of said control angle.

7. A device according to claim 6, wherein said calculating unit calculates said control angle according to a relationship which expresses said control angle as a constant value.

8. A device according to claim 6, wherein a measured value of a current, continuously sensed in the converter station, is supplied to said calculating unit, which calculates said control angle according to a relationship which expresses said control angle as a linear function of said measured value of a current continuously sensed in the converter station.

9. A device according to claim 8, wherein a voltage value, formed in dependence on a measured value of a voltage continuously sensed in the converter station, is supplied to said calculating unit, which calculates said control angle according to a relationship which expresses said control angle as a linear function of a quotient between said measured value of a current continuously sensed in the converter station and said voltage value.

10. A device according to claim 6, wherein the control equipment comprises a limiting member, which limits said calculated value of said control angle so as not to exceed a maximum value and not to be lower than a minimum value.

* * * * *